A. DAY.
ICE CUTTING MECHANISM.
APPLICATION FILED MAY 29, 1908.
982,040.
Patented Jan. 17, 1911.
2 SHEETS—SHEET 1.
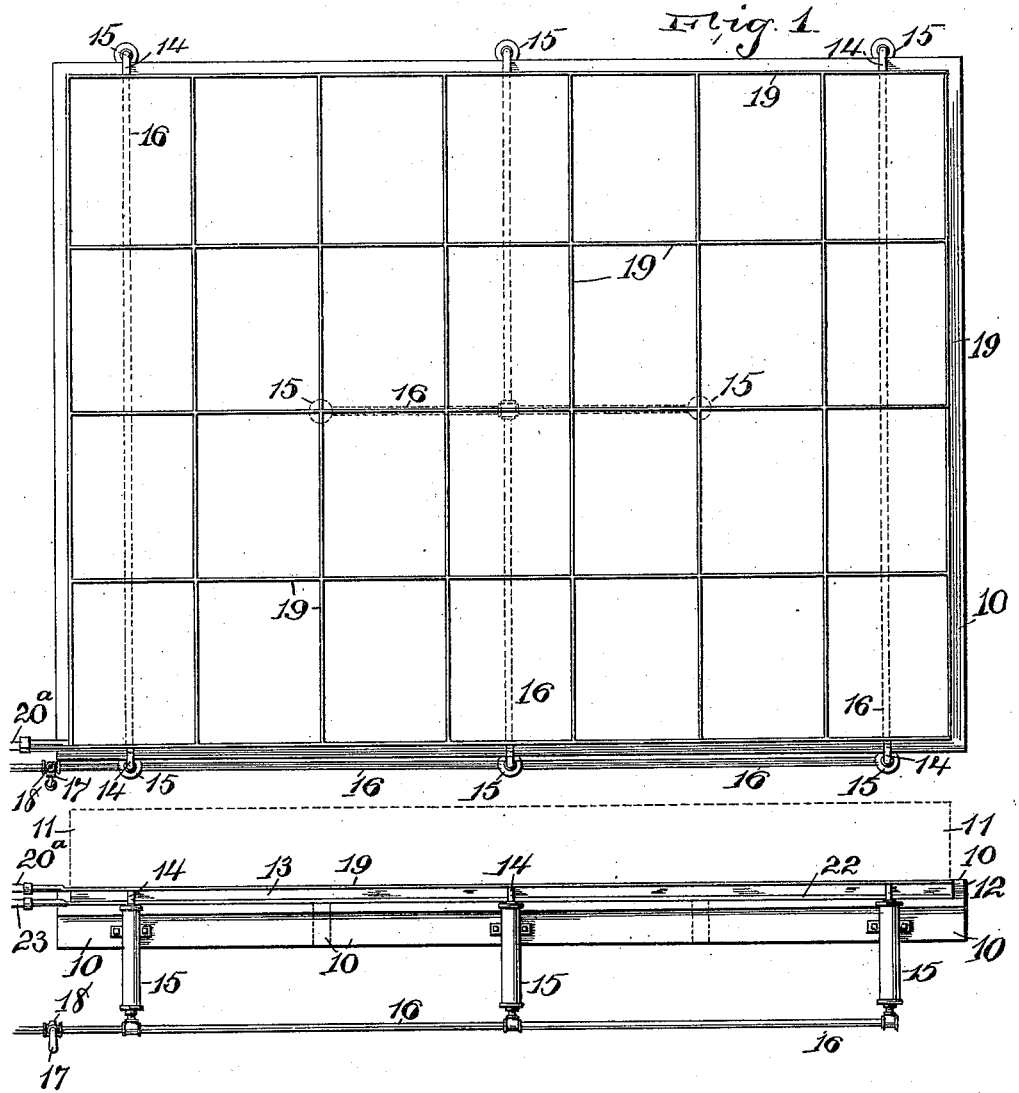
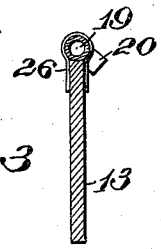
WITNESSES:
M. Johnson
S. A. Rogers
INVENTOR
Abraham Day
BY
Wm. H. Canfield
ATTORNEY.

A. DAY.
ICE CUTTING MECHANISM.
APPLICATION FILED MAY 29, 1908.

982,040.

Patented Jan. 17, 1911.
2 SHEETS—SHEET 2.

WITNESSES:
M. Johnson
S. A. Rogers.

INVENTOR
Abraham Day
BY
Wm H Caufield.
ATTORNEY

UNITED STATES PATENT OFFICE.

ABRAHAM DAY, OF BLOOMFIELD, NEW JERSEY.

ICE-CUTTING MECHANISM.

982,040. Specification of Letters Patent. Patented Jan. 17, 1911.

Application filed May 29, 1908. Serial No. 435,650.

*To all whom it may concern:*

Be it known that I, ABRAHAM DAY, a citizen of the United States, residing at Bloomfield, in the county of Essex and State of New Jersey, have invented certain new and useful Improvements in Ice - Cutting Mechanism; and I do hereby declare the following to be a full, clear, and exact description of the invention, such as will enable others skilled in the art to which it appertains to make and use the same, reference being had to the accompanying drawings, and to figures of reference marked thereon, which form a part of this specification.

This invention is designed to provide an apparatus for cutting plate-ice, as it is known in the ice-making trade, into small cakes, which cakes are preferably of uniform size and weight, and this invention is designed to cut a large cake up at once, forming all the smaller cakes simultaneously, thus economizing on time and labor.

The invention is further designed to provide means for returning the cutting mechanism back through the cut sheet or plate without delay, even when small pieces of ice fall down between the cakes, in the process of cutting, and thus have a tendency to prevent the ready return of the cutting mechanism.

The invention is illustrated on the accompanying drawings, in which—

Figure 4:
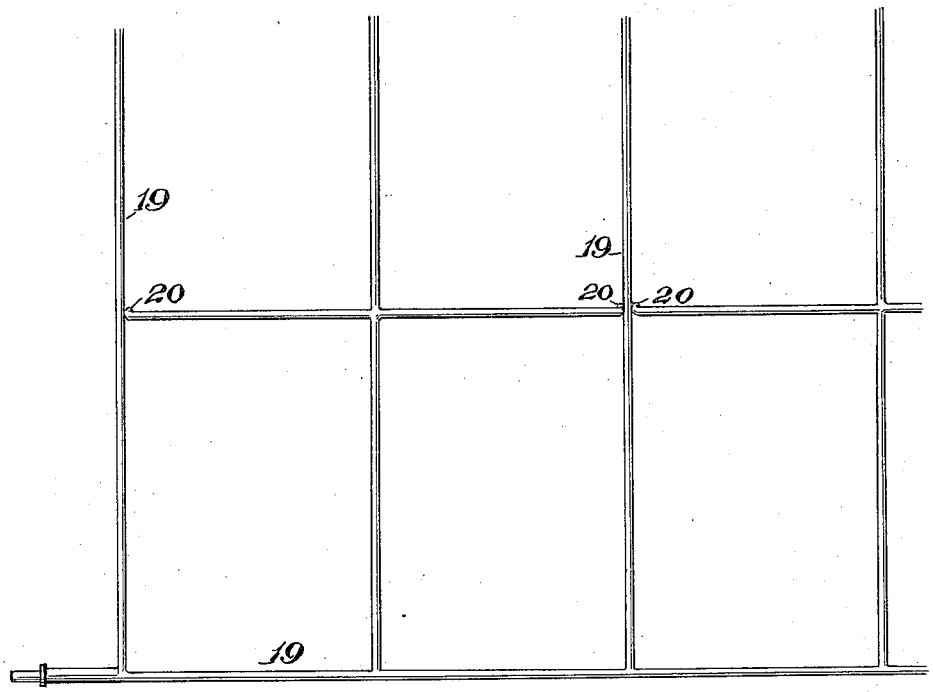
Figure 5:
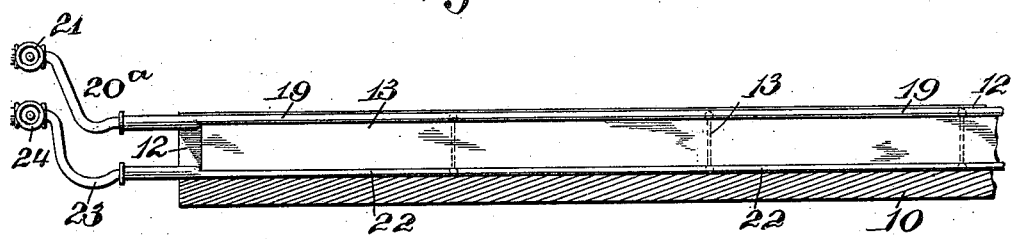

Figure 1 is a top view of a platform, as commonly used in ice-plants, on which is deposited the plate or sheet of ice, and Fig. 2 is a side view of the same, both these views showing the cutting mechanism installed therein. Fig. 3 is a view of one of the cutting ribs, and Fig. 4 is a view of the cutting mechanism on a scale larger than Fig. 1. Fig. 5 is a side view of the same, showing a part of the platform in section, and Fig. 6 is a section through the platform showing one of the cutting ribs with the return cutting attachment thereon.

In the drawings the platform 10 is of the form used in ice-plants as at present constructed, and on these platforms are arranged the frozen plates or sheets of ice, known in the trade as plate-ice, as distinguished from the ice which is frozen in cans of the proper dimensions and then emptied from the cans. The plate-ice, as now made, is placed on the platform 10 and then cut up into cakes, the workmen proceeding from one end of the sheet to the other, and this takes considerable time. In the present construction I provide the platform 10 with grooves 12 properly spaced so as to outline the size of cakes of ice desired, and in each of these grooves is arranged a rib 13, these ribs crossing one another and being properly joined at their junctures to form an integral structure or frame of ribs, and this frame is adapted to be raised by a series of piston rods 14 projecting from the cylinders 15, which cylinders are connected by piping 16 so that when the valve 17 is operated, a fluid under pressure is admitted to the cylinder 15, thus actuating the piston rods 14, which are attached to the ribs 13, to raise the whole structure perpendicularly from the platform 10. When it is desired to allow the ribs 13 to descend, the valve 17 is shut off, and this valve is of the form that has a vent 18 which vents the fluid under pressure from the cylinders 15 on the pipe 16 to permit the descent of the ribs 13. When the ribs 13 are down in the grooves 12 they are flush or slightly beneath the top surface of the platform on which the plate of ice 11 rests. On the top edge of each of the ribs 13 are placed the pipes 19 which are connected preferably through a flexible connection $20^a$, regulated by a valve 21 to a suitable source of heat supply, preferably steam.

It will be observed that when the valve 21 is opened, steam enters the pipes 19 which are all connected, preferably by solder, so as to form smooth joints and corners, and the whole cutting mechanism becomes hot on its top surface. When this live steam condenses, it flows out in the shape of warm water through the outlets 20, shown more particularly in Figs. 3 and 4. With steam passing through the pipes 19, the valve 17, admitting the fluid under pressure to the cylinders 15, is opened and the cutting mechanism slowly rises from the platform 10 and the hot pipes 19 pass through the plate of ice, cutting it into cakes of the desired size, preferably of a size bearing relation to the whole cake as shown in Fig. 1. It takes but a short time to send this cutting mechanism up through a plate of ice, the plates being about a foot thick, and when the pipes emerge from the top edge of the plate of ice, the heat is turned off, the valve 17 is closed so as to vent the cylinders 15, and the cutting mechanism descends by its own weight into the grooves 12. If the cutting mechanism sticks slightly in the spaces between the cakes, a slight pressure of the foot around its edges will usually cause it to seat itself. I have found, however, that sometimes, as the cutting mechanism nears the top of the plate of ice being cut, the edges of the smaller cakes will crackle and small pieces of ice will fall down in the spaces between the cakes, when the cutting mechanism has finished its cutting, and thus clog up the interstices between the cakes and prevent the ready return of the cutting mechanism. To overcome this difficulty I provide means for allowing the cutting mechanism to melt its way, if necessary, on its return to the grooves 12, and to accomplish this I can equip the ribs 13 with pipes 22 on the bottom, these pipes 22 having a flexible connection 23 and a valve 24 to regulate the admission of a heating medium to the pipes 22. This forms a cutting mechanism that will cut in both directions, but it will of course be understood that the lower pipes 22 will not be used unless there is a stoppage in the return of the cutting mechanism, in which case the valve 24 can be turned to admit a heating medium, preferably steam, to the pipes 22 and the cutting mechanism will quickly descend.

Figure 6:
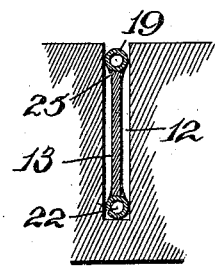

As stated before, I prefer to join the pipes 19 and the pipes 22 at their junctures by means of solder, and I prefer also to solder the pipes to the ribs 13 as shown at 25 in Fig. 6. I show however, in Fig. 3, another method of securing pipes to the ribs by means of the strips 26 which can be passed around the pipes at suitable points, these strips being made of sheet metal and having their projecting ends riveted or soldered to the opposite sides of the ribs 13.

This cutting-apparatus makes a clean cut, the sides of which are for the most part smooth, and its greatest advantage is in the short time it takes to cut up a large plate of ice, it requiring but one man to turn on the fluid under pressure to elevate the cutting-mechanism and also the heating medium to provide a cutting-mechanism with means for melting its way through the plate of ice. After the cutting has been accomplished and the cutting-mechanism returns to the platform, the cakes can be rapidly slid from the platform to their destination in a store-house or to wagons, and the platform is ready for submerging and another freezing of a cake of ice thereon.

I prefer to form the edges of the cutting-mechanism about in line with the edges of the plate of ice so as to provide all edges of the cakes with smooth sides.

Having thus described my invention, what I claim is:—

1. An ice-cutting-mechanism comprising a platform adapted to hold a plate of ice, a cutting-mechanism comprising a series of ribs crossing each other adapted to form a frame and rest on the platform, means for supplying the top edge of the frame with a heating medium, and means for forcing the cutting-mechanism from the platform and through a plate of ice.

2. An ice-cutting-mechanism comprising a platform having grooves therein, a cutting-mechanism comprising a frame-work of ribs crossing each other and setting in the grooves, means for supplying a heating medium to the top edge of the frame-work, and means for forcing the frame-work from its grooves through the plate of ice to simultaneously cut the plate into cakes.

3. An ice-cutting-mechanism comprising a platform having grooves therein, a series of ribs forming a frame, pipes secured to the top edge of the ribs, means for supplying a heating medium to the pipes, and means for forcing the frame from its grooves.

4. An ice-cutting-mechanism comprising a platform adapted to hold a plate of ice on its top surface, a series of crossed ribs forming a frame with a heating medium thereon on the platform and normally lying underneath the ice, a series of cylinders, piston rods projecting from the cylinders and connected with the cutting-mechanism, means for regulating the admission of a fluid under pressure to the cylinders, and means for venting the cylinders when the supply of fluid under pressure is cut off.

5. An ice-cutting-mechanism comprising a platform having grooves in its top surface, a frame-work of crossed ribs lying in the grooves, a series of cylinders supporting the frame, means for regulating the admission of a fluid under pressure to the cylinders, and means for venting the cylinders when the supply of fluid under pressure is cut off.

6. An ice-cutting-mechanism comprising a platform having grooves in its top surface, a series of ribs forming a frame and setting in the grooves, a series of pipes on the top edge of the ribs, means for feeding and regulating a supply of heating medium to the pipes on the top of the ribs, a series of pipes on the bottom edges of the ribs, means for feeding and regulating a supply of heating medium to the pipes on the bottom of the ribs, a series of cylinders having their piston rods connected to the ribs, means for regulating the admission of a fluid under pressure to the cylinders, and means for venting the cylinders when the supply of fluid under pressure is cut off.

7. An ice-cutting-mechanism comprising a series of crossed ribs forming a frame, a series of pipes secured to the top of the frame and adapted to receive a heating medium, and a series of pipes on the bottom of the frame and also adapted to receive a heating medium, whereby it can cut both ways.

8. An ice-cutting-mechanism comprising a series of ribs forming a frame, a series of pipes secured to the top of the frame and adapted to receive a heating medium, a series of pipes on the bottom of the frame and also adapted to receive a heating medium, and means for independently regulating the supply of heating medium to each of the series of pipes.

9. An ice-cutting-mechanism comprising a frame formed of ribs and adapted to pass through a plate of ice, and means for independently supplying the opposite sides of the frame with a heating medium.

10. An ice-cutting-mechanism comprising a platform having grooves therein, a series of ribs forming a frame and adapted to rest in the grooves, a series of pipes on the top edge of the ribs, a series of pipes on the bottom edge of the ribs, a flexible connection for each series of pipes, a valve for independently regulating the admission of a heating medium to each series of pipes, and means for forcing the frame from its grooves.

11. An ice-cutting-apparatus comprising a platform, a series of pipes arranged on the platform, means for regulating the admission of a heating medium to the pipes, and means for forcing the pipes from the platform.

In testimony, that I claim the foregoing, I have hereunto set my hand this 28th day of May 1908.

ABRAHAM DAY.

Witnesses:
WM. H. CAMFIELD,
E. A. PELL.